United States Patent [19]

Tanaka et al.

[11] Patent Number: 4,488,309
[45] Date of Patent: Dec. 11, 1984

[54] GAS LASER APPARATUS

[75] Inventors: Masaaki Tanaka; Yukio Sato; Masao Hishii; Haruhiko Nagai, all of Hyogo, Japan

[73] Assignee: Mitsubishi Denki Kabushiki Kaisha, Tokyo, Japan

[21] Appl. No.: 417,287

[22] Filed: Sep. 13, 1982

[30] Foreign Application Priority Data

Sep. 16, 1981 [JP] Japan ................................ 56-145679
Jul. 1, 1982 [JP] Japan ................................ 57-114628

[51] Int. Cl.³ .............................................. H01S 3/097
[52] U.S. Cl. ....................................... 372/87; 372/29; 372/55
[58] Field of Search ...................... 372/55, 87, 83, 86, 372/29

[56] References Cited

U.S. PATENT DOCUMENTS

3,781,712 12/1973 Judd ...................................... 372/87
4,343,040 8/1982 Shibayama et al. .................. 372/87

Primary Examiner—William L. Sikes
Assistant Examiner—Léon Scott, Jr.
Attorney, Agent, or Firm—Sughrue, Mion, Zinn, Macpeak & Seas

[57] ABSTRACT

A gas laser apparatus having an anode and a cathode for imparting a glow discharge to a stream of laser gas in response to a high d.c. voltage, also includes a dielectric electrode positioned within said stream of laser gas between the anode and cathode for exciting a pulsed silent discharge of the laser gas in response to an a.c. high voltage power source that supplies a pulsed high a.c. voltage to said dielectric electrode. A pulsed large-current glow discharge is produced between the anode and cathode to thereby emit a large, pulsed laser output. The apparatus may also include controls for controlling the power of the silent discharge excited by the dielectric electrode to thereby control the laser output.

23 Claims, 21 Drawing Figures

GAS LASER APPARATUS

FIELD OF THE INVENTION

The present invention relates to a gas laser apparatus, more particularly, to an apparatus for producing pulsed laser oscillation.

BACKGROUND OF THE INVENTION

Figure 1:
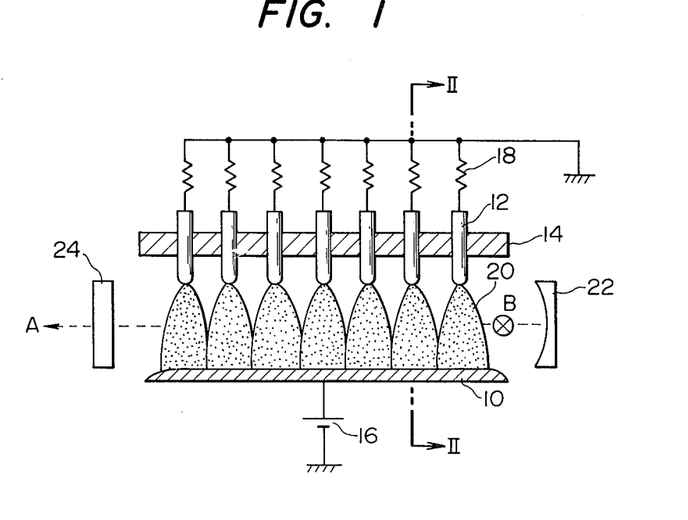
FIG. 1 is a longitudinal section of a conventional triaxial orthogonal gas laser apparatus.
Figure 2:
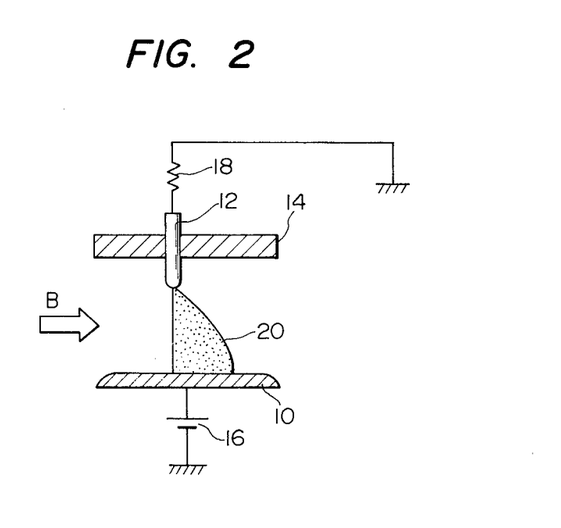
FIG. 2 is a cross section taken on the line II—II of FIG. 1.

A typical laser apparatus of the type contemplated by the present invention is a triaxial orthogonal $CO_2$ laser wherein the axis of laser light, the path of d.c. glow discharge and the direction of gas flow intersect at right angles. A logitudinal section of a conventional triaxial orthogonal laser is shown in FIG. 1. A cross section taken on the line II—II of FIG. 1 is shown in FIG. 2, wherein like components are indentified by like numerals. In FIG. 1, the numeral 10 indicates an anode, 12 shows a plurality of cathodes, 14 is a cathode substrate made of an insulator material, 18 designates stabilizing resistors, 16 is a high-voltage d.c. power source, 20 is a discharge exciting area, 22 is a total reflection mirror, and 24 is a partial reflection mirror having a proper reflectance. The laser of FIG. 1 is operated as follows. A laser gas made of a mixture of $CO_2$, $N_2$ and He is caused to flow between anode 10 and cathode 12 at a rate of several tens of meters per second in the direction indicated by arrow B. A voltage from power source 16 produces a discharge between the electrodes, and current flows through stabilizing resistor 18. The discharge will be a nondisruptive glow discharge without changing to an arc discharge. As a result of the glow discharge, exciting area 20 causes a population inversion between specific ocsillation levels of the $CO_2$ molecule in the laser gas. Laser oscillation takes place between total reflection mirror 22 and partial reflection mirror 24, and a laser beam is emitted from partial reflection mirror 24. Therefore, total reflection mirror 22 and partial reflection mirror 24 make up a laser oscillator. The laser output is increased as the discharge power is increased, and with a given number of cathodes 12 shown in FIG. 1, the increase in discharge power is equivalent to the increase in discharge density. To reduce the size and cost of the apparatus, the discharge density is desirably increased, but if the discharge power exceeds a certain level, a hot spot occurs in a certain part of the discharging area, and the glow discharge changes to an arc discharge in spite of stabilizing resistors 18. With an arc discharge, a laser output is no longer produced and the laser gas is considerably deteriorated. Therefore, as a compromise between the requirements of small size and high reliability, conventional laser oscillators are designed so that maximum output is produced just before the glow discharge changes to an arc discharge.

Figure 3A:
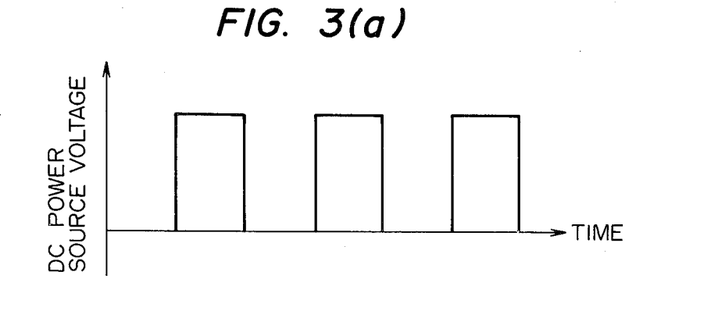
FIG. 3(a) is the waveform of a pulsed output from a d.c. high-voltage power source.
Figure 3B:
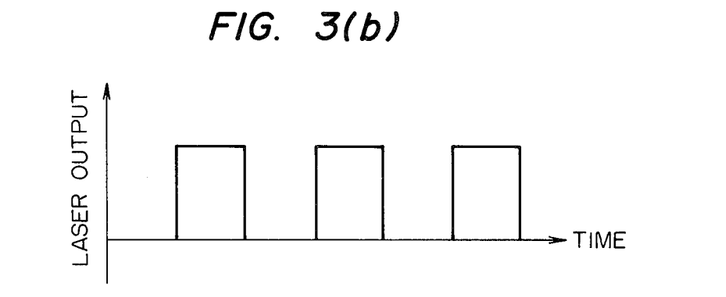
FIG. 3(b) is the waveform of the resulting laser output.

When laser light is used on a workpiece made of a material having high thermal condectivity, such as metal, the thermal energy is dissipated through the workpiece. A pulsed laser having the same average output as a continuous laser of uniform output will have peaks at intervals providing a larger working energy and achieves a higher working precision than the laser output from the continuous laser. Therefore, in the conventional laser of the type shown in FIG. 1, the output from d.c. high-voltage source 16 is converted into a pulsed output as shown in FIG. 3(a) and produces a pulsed laser output as shown in FIG. 3(b).

With such a pulsed laser oscillator, the peak laser output obtained is not greater than the maximum output of time-independent laser oscillation (continuous oscillation), and to obtain an average output equal to that achieved by continuous oscillation, a large oscillator using an increased number of cathodes 12 is necessary. For instance, if the duty factor is 50% as shown in FIG. 3(a), to obtain an average laser output equal to that achieved by time-independent (continuous) oscillation, the size of the oscillator and power capacity must be doubled. Additionally, where the laser oscillation is caused only by glow discharge, as in FIG. 1, if the rise time of a voltage pulse is too short, insufficient heat diffusion in the interior of the glow discharge will cause thermal non-equilibrium, and this will produce an arc even if the current flowing is below the arc producing level. To prevent the latter from occurring, the rise time of current applied to the conventional laser oscillator cannot be shorter than a certain period, and the resulting pulsed output has a maximum frequency of only about several tens of hertz.

But as is well known, working with laser light requires higher pulse frequencies for achieving higher working precision and working speed, and thus, the development of a more compact laser apparatus that achieves higher frequencies and which is also easy to operate has been desired. For instance, to cut a metal or nonmetallic plate with a laser beam, the laser output must be switched on and off or slope-controlled in synchronism with the travel of the work. Conventionally, this is achieved by controlling the current flowing through d.c. high-voltage power source 16, but it has been difficult to secure reliable control of the large power necessary for cutting. For example, discharge power as great as 5 to 10 kw is necessary to cut a metal plate as thick as several millimeters. A vacuum switch or ignitron is usually employed to control such large power, but these switching devices are short-lived or require much skill and time for maintenance. Furthermore, d.c. high-voltage power source 16 usually includes a rectifier circuit and a smoothing circuit, and the time constant of the smoothing circuit is a limiting factor on the control speed.

SUMMARY OF THE INVENTION

Therefore, one object of the present invention is to provide a compact gas laser apparatus that produces a large, pulsed output having high pulse frequencies.

Another object of the invention is to provide a gas laser apparatus that is capable of controlling a large, pulsed laser output of high frequency by controlling small power.

Yet another object of the invention is to provide a gas laser apparatus that is capable of establishing a stable glow discharge even if the rise time of the glow discharge current is shortened.

A further object of the invention is to provide a gas laser apparatus that is capable of high precision in working with a laser beam by increasing the control speed of the laser output through the use of a silent discharge.

These objects of the present invention can be achieved by a gas laser apparatus comprising an anode and a cathode that are positioned within an enclosed chamber so as to face each other with a stream of laser gas confined therebetween, a d.c. high-voltage power source that supplies a high d.c. voltage between the anode and cathod, a partially reflecting mirror and a total reflecting mirror that make up an oscillator and which are positioned in a face-to-face relation via the discharging area formed by the anode and cathode, a dielectric electrode that is positioned within said stream of laser gas between the anode and cathode and which excites a pulsed silent discharge between the dielectric electrode and the anode and between the dielectric electrode and the cathode, and an a.c. high-voltage power source that supplies a pulsed a.c. high voltage to the dielectric electrode, a pulsed, large-current glow discharge being produced between said anode and cathode to thereby emit a large, pulsed laser output.

DESCRIPTION OF THE PREFERRED EMBODIMENTS

The present invention uses silent discharge as a preliminary ionizing means for stabilizing glow discharge and it also uses effectively the change in the characteristics of main glow discharge due to the preliminary ionization. Therefore, the invention is based on our intensive study of the characteristics of main glow discharge when silent discharge is used as a preliminary ionization source, and the following description of the operation of the laser apparatus according to the present invention will proceed by reference to these characteristics of main glow discharge.

Figure 4:
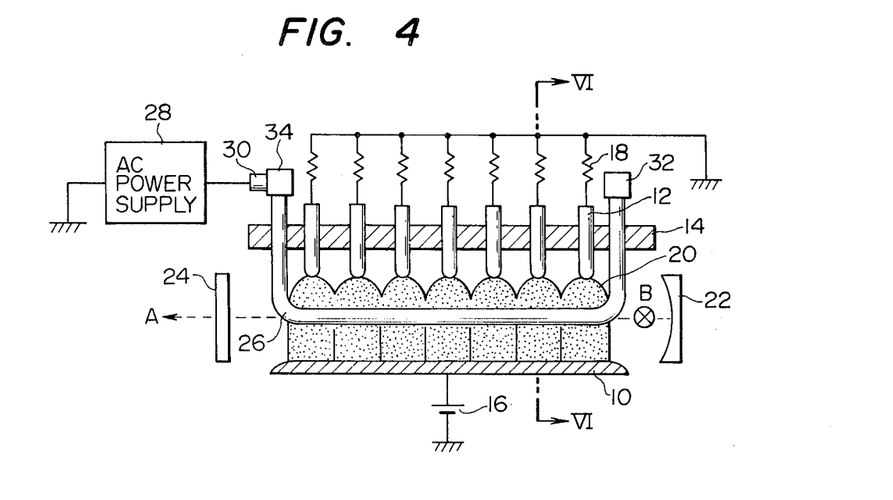
FIG. 4 is a longitudinal section of a triaxial orthogonal laser apparatus according to one embodiment of the present invention.
Figure 5:
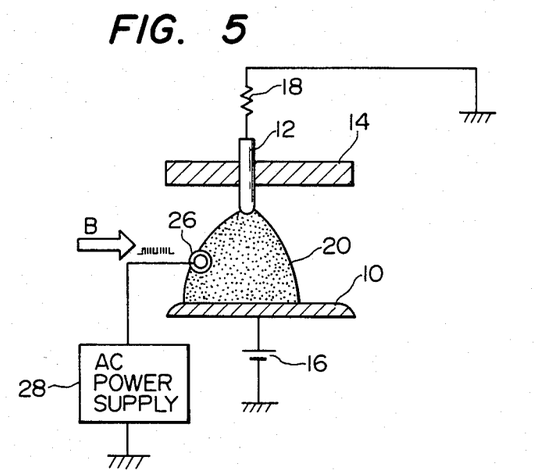
FIG. 5 is a cross section of FIG. 4 taken on the line V—V.
Figure 6:
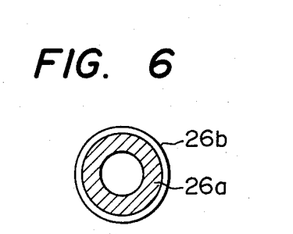
FIG. 6 is a cross section of a dielectric electrode.

FIG. 4 is a longitudinal section of the triaxial orthogonal laser apparatus according to one embodiment of the present invention, and FIG. 5 is a cross section taken on the line VI—VI of FIG. 4. In FIG. 4, the numeral 26 indicates a dielectric electrode positioned in discharge exciting area 20, 32 is an inlet for water to cool the dielectric electrode, 34 is an outlet for the cooling water, 30 is a high-voltage terminal, 28 is a high-voltage a.c. power source that supplies a pulsed a.c. high voltage for producing a silent discharge. FIG. 6 is a cross section of dielectric electrode 26, which is an "enameled electrode" comprising a metal tube, such as iron tube 26a, coated with a layer of glass or other dielectric material 26b. According to the arrangement of FIG. 4, when the high-voltage a.c. power source 28 is turned on, a nondisruptive discharge, called silent discharge, is produced between dielectric electrode 26 and anode 10 and between dielectric electrode 26 and cathode 12. The silent discharge current is one-twentieth of the current of the main glow discharge to be described later. When the high-voltage d.c. power source 16 is subsequently turned on, a glow discharge is produced between anode 10 and cathode 12 to form a discharging area 20 as shown in FIG. 5.

Figure 7:
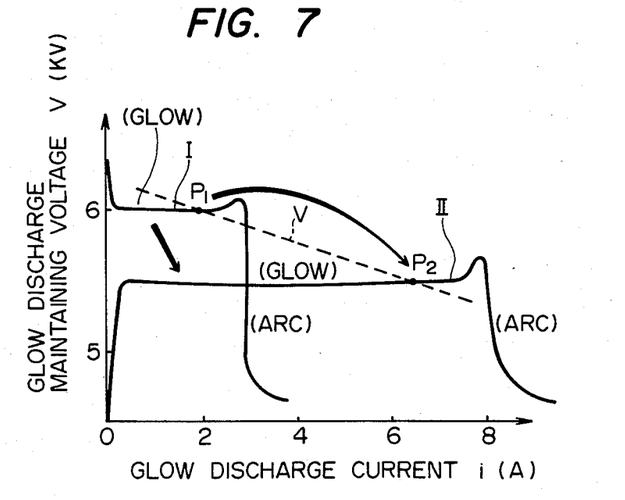
FIG. 7 is a diagram showing the glow discharge characteristics of the apparatus shown in FIG. 4.

If preliminary ionization is effected by the silent discharge, there occurs a great change in the voltage v.s. current characteristics of the subsequent glow discharge. One example of such voltage vs. current characteristics is depicted in FIG. 7 wherein the y-axis indicates the voltage (V) for maintaining the glow discharge and the x-axis indicates the glow discharge current (i). Cuver I represents the voltage vs. current characteristics of the case having no silent discharge, and curve II represents the voltage vs. current characteristics of the case where a stationary silent discharge is being effected, i.e., a large a.c. voltage is supplied from power source 28.

The flat portion (constant current area) of each curve represents the case where a glow discharge is produced, and the portion where the voltage drops sharply with the increasing current indicates the change from glow discharge to arc discharge. As already mentioned, a conventional laser apparatus is so designed that it produces maximum output at a point of time where the glow discharge is changed to an arc discharge. Comparison between the two characteristic curves shows that if preliminary ionization is effected by silent discharge, the current necessary for changing the glow discharge to arc discharge is a few times larger than that required when no silent discharge is effected and that at the same time, the voltage for maintaining the glow discharge is decreased.

Figure 8:
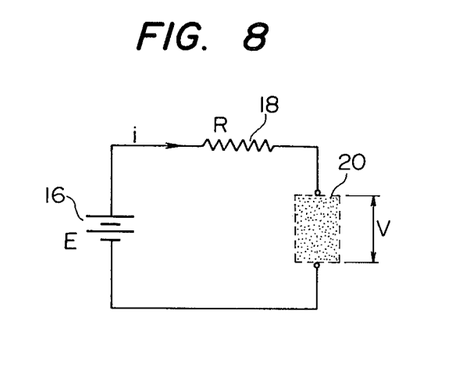
FIG. 8 is an equivalent circuit diagram of d.c. glow discharge.

Referring to the equivalent circuit diagram of FIG. 8, the symbol E indicates the output voltage from d.c. high-voltage power source 16, i indicates the glow discharge current, V is the voltage for maintaining the glow discharge and 18 is the stabilizing resistor. One can readily understand that the following relation is established in FIG. 8:

$$V = E = iR$$

Figure 9:
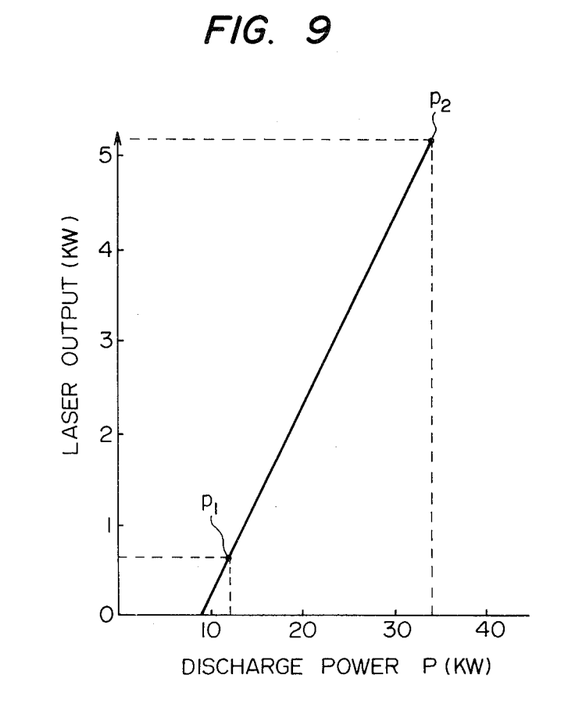
FIG. 9 is a characteristic diagram showing the relation between discharge power and laser output according to the embodiment shown in FIG. 4.

The characteristic curve (V) of this relation is drawn by a dashed line in FIG. 7, and the point $P_1$ where curve V crosses curve I is the operating point of the laser apparatus when no silent discharge is effcted. The product of voltage and current at point $P_1$ is the power of glow discharge for that point, which is $P_1=6$ kV$\times 2$ A$=12$ kW. But if silent discharge is effected with the same apparatus (the same resistance R), the operating point shifts to point $P_2$ where curve V crosses curve II. The resulting discharge power is $P_2=5.5$ kV$\times 6.25$ A$=34$ kW, which is about 2.9 times as large as $P_1$, and this provides a proportional increase in the resulting laser output. One example of the relation between discharge power P and laser output is shown in FIG. 9. At operating point $P_1$, the laser output is 0.7 kW for a discharge power of 12 kW, and at point $P_2$, the laser output is 5.3 kW for a discharge power of 34 kW.

Figure 10A:
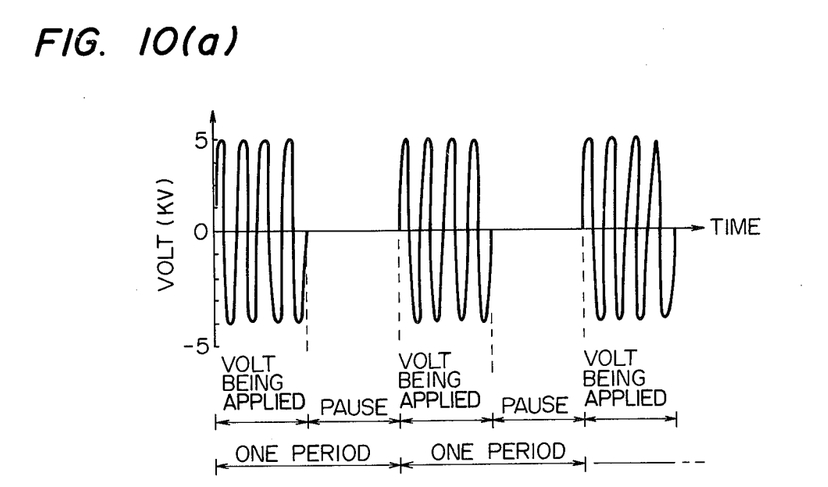
FIG. 10(a) shows the waveform of output voltage from an a.c. high-voltage power source.
Figure 10B:
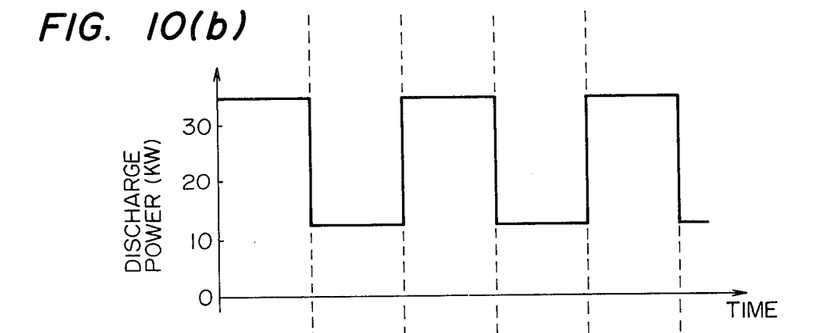
FIG. 10(b) shows the waveform of glow discharge power.
Figure 10C:
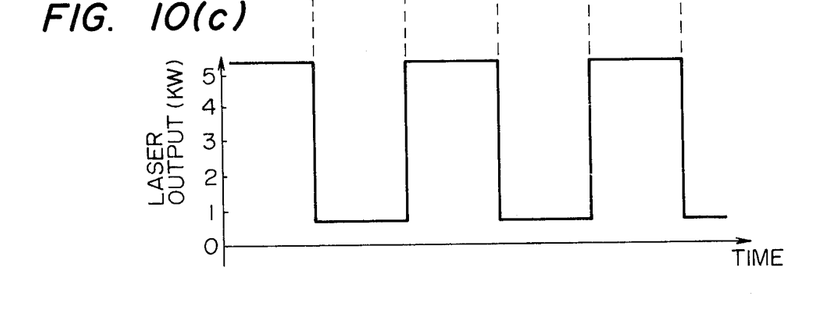
FIG. 10(c) shows the waveform of laser output.

At discussed above, the characteristics of glow discharge can be varied greatly, by using silent discharge as a preliminary ionizing source, and the present invention uses this phenomenon to produce a large pulsed laser output from a large pulsed discharge power. FIG. 10 is a waveform diagram that illustrates the operation of the laser apparatus according to one embodiment of the present invention. FIG. 10(a) is a waveform of a pulsed output voltage from high-voltage a.c. power source 28, FIG. 10(b) is a waveform of discharge power versus time and FIG. 10(c) is a waveform of the resulting laser output. The high-voltage a.c. is applied for a given period, and its application is suspended for a given period, and this cycle is repeated at a frequency of fp. As mentioned earlier, the power of silent discharge is only a fraction of that of main glow discharge, so the waveform of the voltage for causing silent discharge can be easily controlled. In response to the application of such voltage, a silent discharge takes place at a frequency of fp. Consequently, operating point $P_1$ in FIG. 7 shifts to $P_2$ at a frequency of fp, and if the d.c. power source is a constant-voltage power supply, the power supplied changes as shown in FIG. 10(b), producing a pulsed laser output as shown in FIG. 10(c).

According to the illustrated embodiment where preliminary ionization is effected by silent discharge, active heat diffusion prevents the formation of thermal nonequilibrium in the interior of the glow discharge, and a stable glow is maintained in spite of a change in the glow discharge current. Our experiment achieved a maximum pulse repetition frequency (fp) of about 10 kHz at a laser gas pressure of 200 Torr. According to the embodiment of FIG. 10, a laser output of about 0.7 kW is produced even when no silent discharge is effected, but since operating points $P_1$ and $P_2$ in FIG. 7 change their positions depending upon the value of resistor 18, it should be understood that the laser output produced in the period when no silent discharge is effected can be freely controlled or can even be made zero by suitable selection of the value of resistor 18.

Figure 11:
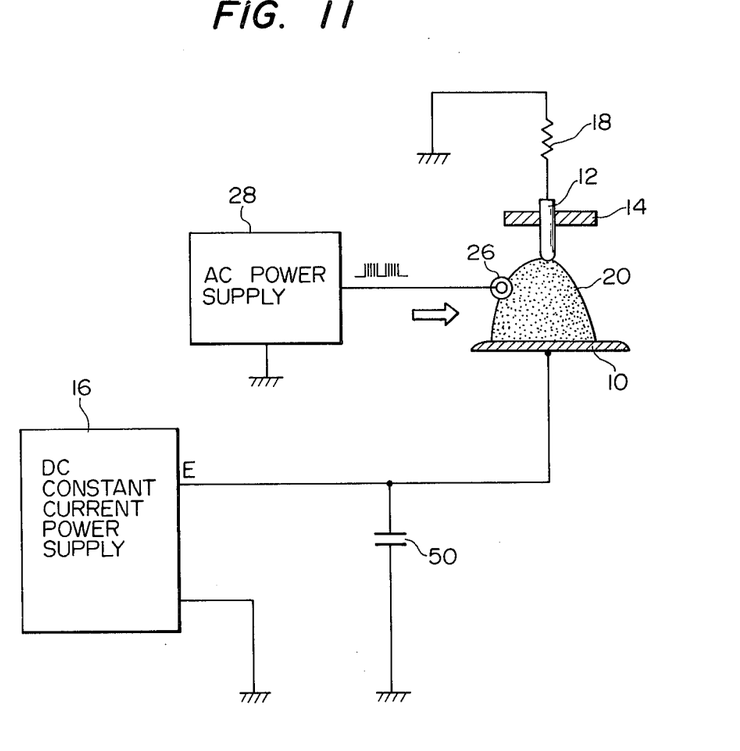
FIG. 11 is a circuit diagram of the laser apparatus according to another embodiment of the present invention.

The foregoing description concerns the case where the d.c. power source 16 is a constant-voltage power supply. FIG. 11 shows another embodiment of the laser apparatus wherein the power source 16 is a constant-current power supply and is connected in parallel to a capacitor 50. In this arrangement, capacitor 50 has a terminal voltage of $E_1$ when no silent discharge is produce, but if it is produced, a great glow discharge current starts to flow, and not all of the necessary discharge current can be supplied from the d.c. constant-current power supply 16 unless it is combined with capacitor 50, and as a result of current supply from both power source 10 and capacitor 50, a pulsed laser output is produced as shown in FIG. 10(c). If the capacitance of capacitor 50 is large enough, there occurs little drop in its terminal voltage and the desired large current can be supplied in the presence of silent discharge. In the illustrated embodiment where d.c. constant current power supply 16 is combined with capacitor 50, the maximum current capacity of the power supply may be equal to the average of the flow discharge current.

Figure 12:
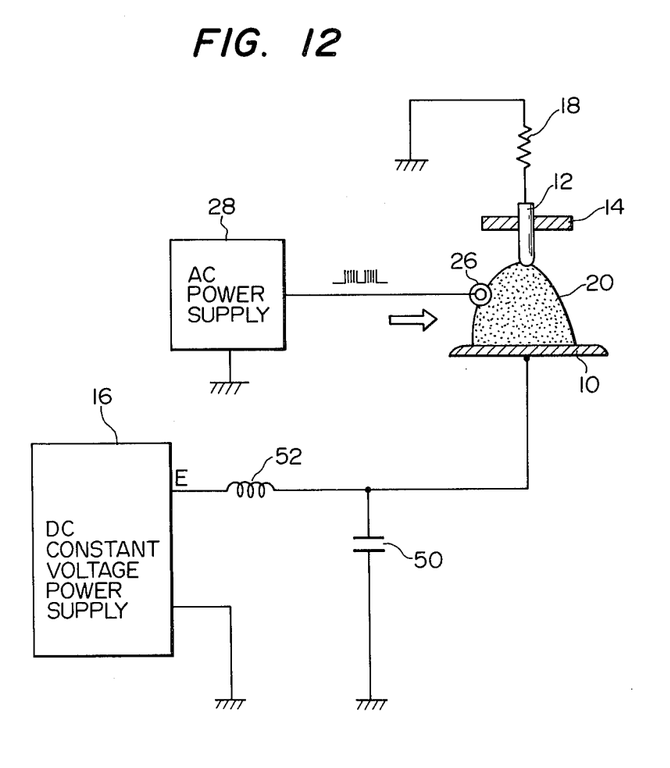
FIG. 12 is a circuit diagram of the laser apparatus according to still another embodiment of the present invention.

FIG. 12 shows another embodiment of the present invention wherein a choke coil 52 is connected between the output terminal of a d.c. constant voltage power supply 16 and capacitor 50. According to this arrangement, the power supply can have a maximum current capacity equal to the glow discharge current so as to reduce the installed capacity of the power supply.

In the foregoing embodiments, d.c. glow discharge is preceded by silent discharge used as a preliminary ionizing source, and the output of the power supply for silent discharge is converted into a pulsed form. The resulting pulsed laser output is twice to three times the output produced by glow discharge alone. Furthermore, the current of the silent discharge is about one twentieth of the main glow discharge current, so it is very easy to control the silent discharge, and hence the pulsed laser output. The use of silent discharge as a preliminary ionizing source enables a quick rise time of the glow discharge current without disturbing the glow, and as a result, the frequency of the laser pulses cah be increased up to 10 kHz.

In the above embodiments, a d.c. high voltage that is not sufficient to cause a glow discharge by itself can be applied between the anode and cathode, and when a pulsed a.c. high voltage is applied to the dielectric electrode to cause a silent discharge, a glow discharge is triggered and a pulsed laser is produced. Alternatively, an equally large pulsed laser output can be produced by supplying between the anode and cathode a d.c. high voltage for producing a glow discharge. This afternative embodiment can be understood as corresponding to the shift from operating point $P_1$ to $P_2$ in the characteristic diagram of FIG. 7.

Figure 13:
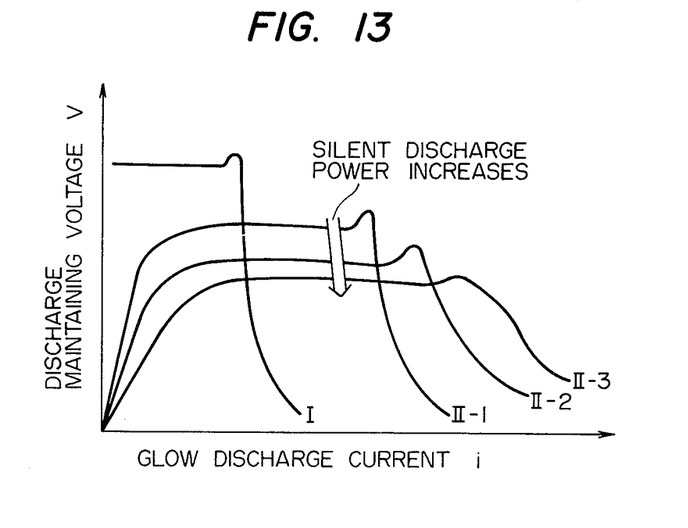
FIG. 13 is a detailed voltage vs. current characteristic diagram of glow discharge.

The second feature of the present invention is to use the silent discharge not only as a preliminary ionizing source, but also as means for controlling the laser output. The following description concerns the use of silent discharge as means to control the laser output. As shown in FIG. 7, it has been demonstrated experimentally that the voltage vs. current characteristics of glow discharge in a laser oscillator, namely the relation between the voltage for maintaining the glow discharge and the discharge current, vary greatly with the presence of silent discharge and the magnitude of the power of silent discharge. Details of such voltage vs. current characteristics are shown in FIG. 13 wherein the y-axis indicates the voltage (V) for maintaining the glow discharge and the x-axis indicates the glow discharge current (i). Curve I represents the characteristics of glow discharge in the absence of silent discharge, and curves II-1, II-2 and II-3 represent the characteristics of glow discharge preceded by stationary silent discharge (a high voltage is supplied from a.c. power source 28) producing different power outputs. The flat portion (constant current area) of each curve represents the case where glow discharge is produced, and the area where the voltage (V) drops shaply with the increase in current (i) respresents the change from glow discharge to arc discharge. As already mentioned, a conventional laser apparatus is designed to produce its maximum output at a point in time just before the glow discharge shifts to arc discharge.

As is clear from FIG. 13, if preliminary ionization is effected by silent discharge, the current necessary for changing glow discharge to arc discharge is significantly larger than that required in the absence of silent discharge, and the difference increases as the power of the silent discharge is increased. On the other hand, the voltage (V) for maintaining the glow discharge is decreased with the increase in the preliminary ionization and the power of the resulting silent discharge. The characteristics shown in FIG. 13 are skillfully incorporated in the present invention which is characterized by changing the power of the silent discharge to effect the desired slop control of the laser output as well as free control of switching the laser output on and off.

Figure 14:
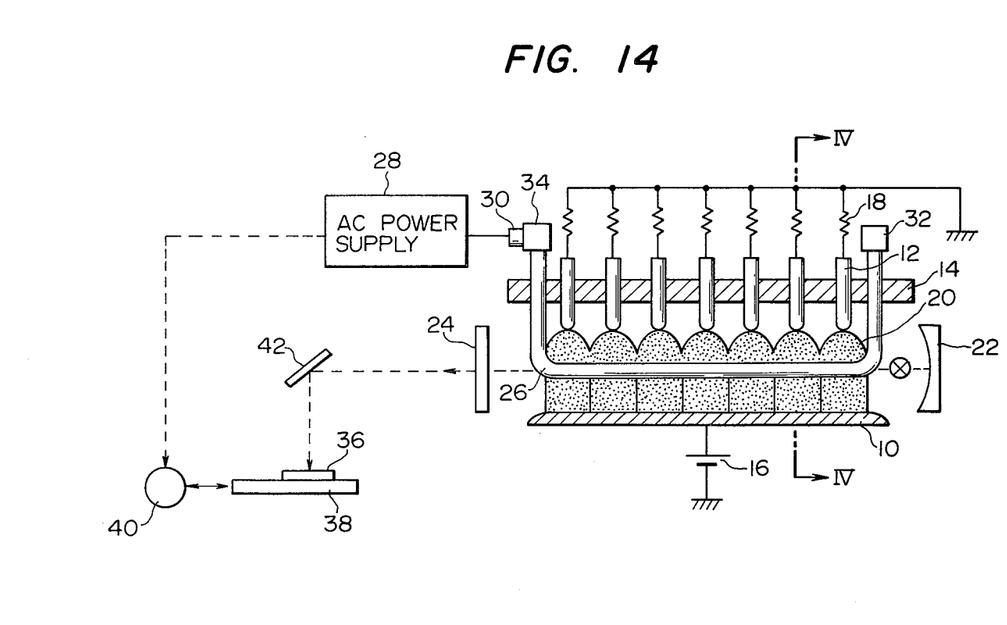
FIG. 14 is a longitudinal section of the gas laser apparatus according to a further embodiment of the present invention using a silent discharge.

This concept can be used in cutting operations as indicated by the embodiment shown in FIG. 14. A workpiece in sheet form 36 placed on a working table 38 is controlled to move along the desired path of a drive motor 40 which, along with a.c. high-voltage power source 28, is supplied with an external control signal to control the travel of the work 36. The output of power source 28 is controlled to adjust the power of the silent discharge, thereby controlling the laser output supplied from the laser oscillator to the work 36 via a morror 42.

Figure 15:
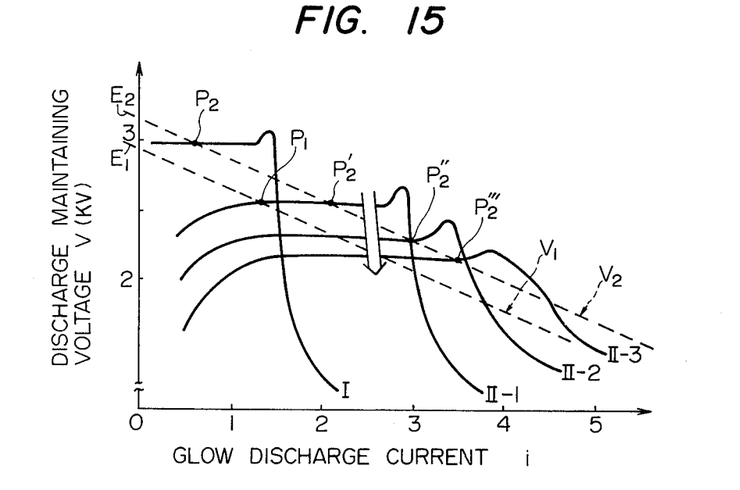
FIG. 15 is a diagram showing the voltage vs. current characteristics of glow discharge and the operating points in the embodiment of FIG. 14.
Figure 16:
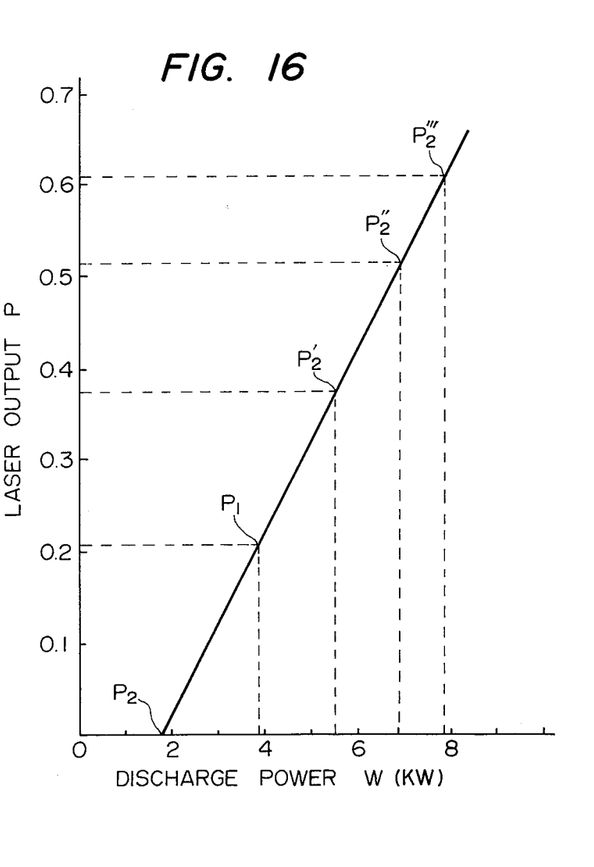
FIG. 16 is a characteristic diagram showing the relation between discharge power and laser output.

The voltage vs. current characteristics of the embodiment of FIG. 14 are shown in FIG. 15 which also depicts electrical load characteristic curves $V_1$ and $V_2$. Curve $V_1$ represents the case of switching control wherein no laser output is produced in the absence of silent discharge and a laser output is produced upon starting silent discharge. Since curve $V_1$ does not cross the voltage vs. current characteristic curve I, no glow discharge takes place in the absence of silent discharge. Therefore, this OFF state of the laser can be used as a stanby state where the laser is waiting for the start of a working sequence. In the system of FIG. 14, if an external signal is supplied to turn on motor 40 and move the work to the predetermined position, as well as to switch an a.c. power source 28, a silent discharge is established between dielectric electrode 26 and anode 10 and between dielectric electrode 26 and cathode 12. As can be seen by the intersection of curve $V_1$ with any of curves II-1, II-2 and II-3, the desired glow discharge results, thereby producing a laser output to perform the necessary working on the workpiece 36. The laser output resulting from the silent discharge is determined by point $P_1$ at which curve $V_1$ crosses curve II-1 (for example), and as seen from FIG. 15, the approximate glow discharge power $W_1$ is $Vi = 2.6 \times 1.5 = 3.9$ kW. FIG. 16 showing the relation between glow discharge power W and laser output indicates that a laser output of 0.21 kW is obtained at operating point $P_1$.

Figure 17:
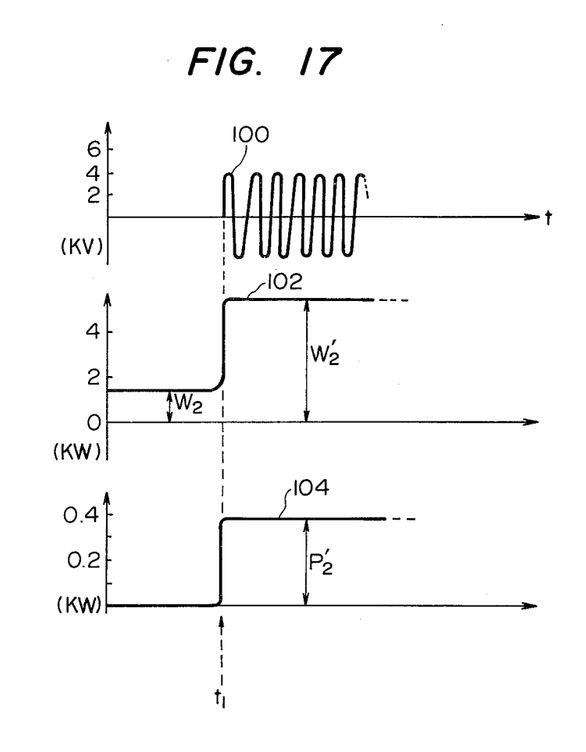
FIGS. 17 and 18 show the waveforms produced when the laser output is controlled by a silent discharge.

Curve $V_2$ in FIG. 15 respresents the case where a voltage of $E_2$ greater than $E_1$ is applied, and it crosses curves I as well as II-1, II-2 and II-3. But as is clear from FIG. 16, the discharge power W at the point of crossing with curve I having no silent discharge is 1.5 kW and this is less than the threshold value for laser output (ca. 1.7 kW), so the glow discharge is not strong enough to produce a laser output. If silent discharge is effected, a glow discharge power $W_2' = 5.5$ (kW) is obtained at point $P_2'$ where curve $V_2$ crosses curve II-1, and hence a laser output $P_2'$ of 0.33 (kW) is produced. A timing chart for this phenomenon is shown in FIG. 17. Before the occurrence of silent discharge, only glow discharge $W_2$ indicated by curve 102 is present and no laser output is produced. When a silent discharge indicated by curve 100 starts at a time $t_1$, the glow discharge shifts to $W_2'$ and at the same time, a laser output $P_2'$ indicated by curve 104 is produced. As described in the foregoing, the switching control of the laser output can be effected very easily by introducing silent discharge.

The present invention also enables the slope control of the laser output by using silent discharge. As is well known, the silent discharge power $W_{SD}$ is virtually controlled by the product of the frequency of power supply (f) and the output voltage ($V_{OP}$), and this is represented by the following relation:

$$W_{SD} \alpha f V_{OP}$$

Figure 18A:
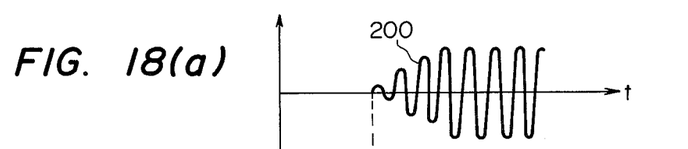
Figure 18B:
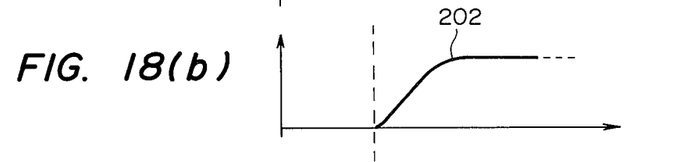
Figure 18C:
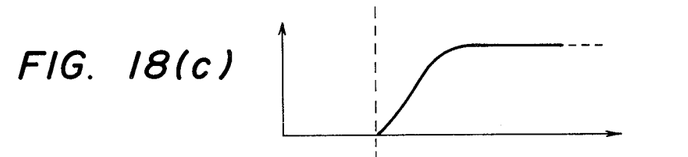
Figure 18D:
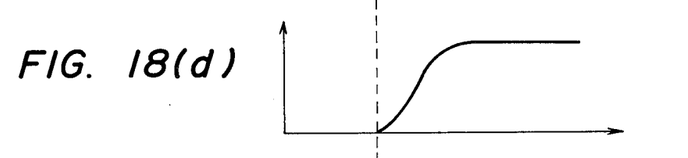
Figure 18E:
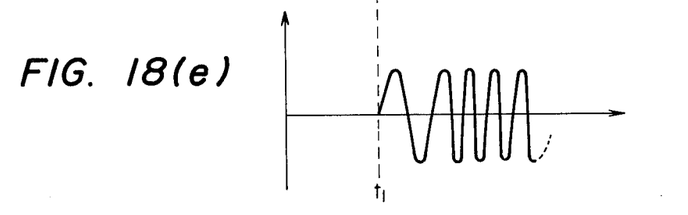

Therefore, if an amplitude-modified a.c. output voltage is produced from a.c. high-voltage power source 28 in synchronism with an external signal as indicated by curve 200 in FIG. 18(a), a silent discharge having time-dependent characteristics as shown by curve 202 in FIG. 18(b) is produced, and the resulting glow discharge also varies with time as shown in FIG. 18(c). Then, as is clear from FIG. 16, the laser output experiences a similar time-dependent change following the curve depicted in FIG. 18(d), and in consequence, the slope control of the laser output can be effected. Alternatively, the time-dependent slope control of the laser output can be accomplished by frequency-modulating the voltage applied for silent discharge as shown in FIG. 18(e). The foregoing description concerns the switching control or slope control at the time of starting to produce a laser output, but it is to be understood that control of switching of the laser output can be effected by stopping silent discharge in synchronism with an external signal or that the falling time of laser output can be controlled in a time-dependent manner by gradually decreasing the silent discharge with time.

As described in the foregoing, the present invention effects switching control and slope control of a laser output not by controlling the power supply of the main glow discharge as in the prior art, but by controlling the power supply of a preliminary silent discharge, and therefore, the invention provides a cheap but reliable gas laser apparatus that requires a control voltage of no more than one twentieth of the voltage necessary for the conventional product.

What is claimed is:

1. A gas laser apparatus having an anode and cathode positioned in an enclosed chamber adapted to provide a stream of laser gas in a discharge area between said anode and cathode, a source of d.c. power for supplying a high d.c. voltage between said anode and cathode, a partially reflecting mirror and a total reflecting mirror positioned with respect to said discharge area to provide an oscillator to produce a laser output, the improvement comprising:

a dielectric electrode positioned in said discharge area between said anode and said cathode, and
   a high voltage a.c. power source connected to provide high voltage a.c. power to said dielectric electrode, whereby a silent discharge is excited between said dielectric electrode and said cathode and anode and a large current glow discharge is produced between said anode and cathode to thereby emit a high power laser output.

2. A gas laser apparatus as claim in claim 1 wherein said high voltage a.c. power provided to said dielectric electrode is pulsed a.c. power resulting in a high power pulsed laser output.

3. A gas laser apparatus according to claim 2 wherein the dielectric electrode comprises a metal tube coated with a layer of dielectric material.

4. A gas laser apparatus according to claim 3 wherein the metal tube is an iron tube.

5. A gas laser apparatus according to claim 4 wherein the dielectric material is glass.

6. A gas laser apparatus according to claim 4 further comprising means for passing cooling water through said metal tube.

7. A gas laser apparatus according to claim 2 wherein said d.c. high-voltage power source is a constant-current power supply.

8. A gas laser apparatus according to claim 7 wherein a capacitor is connected in parallel to the output terminal of the constant-current power supply.

9. A gas laser apparatus according to claim 2 wherein said d.c. high-voltage power source is a constant voltage power supply.

10. A gas laser apparatus according to claim 9 further comprising a coil connected in series with the output terminal of said constant voltage power supply and a capacitor connected between the output terminal of said coil and ground.

11. A gas laser apparatus according to claim 2 wherein the voltage supplied from said d.c. high voltage power source alone is no.t sufficient to produce a glow discharge between said anode and cathode.

12. A gas laser apparatus according to claim 2 wherein the voltage supplied form said d.c. high voltage power source alone is sufficient to produce a glow discharge between said anode and cathode.

13. A gas laser apparatus according to claim 2 wherein said cathode comprises a plurality of electrodes supported on an insulating substrate.

14. A gas laser apparatus as claimed in claim 13 further comprising stabilizing resistors connected in series circuit with said plurality of electrodes and said d.c. high voltage power supply.

15. A gas laser apparatus as claimed in claim 2 further comprising control means for controlling the power of the silent discharge excited by said dielectric electrode, said laser output being controlled by controlling the power of the silent discharge.

16. A gas laser apparatus as claimed in claim 15 wherein the d.c. high voltage supplied to said anode and cathode is insufficient alone to product a laser output, and wherein said control means switches said laser from an off position to an on position by switchably applying said high voltage a.c. power to said dielectric eectrode.

17. A gas laser apparatus according to claim 16 wherein the high d.c. voltage supplied between the anode and cathode is not sufficient to cause glow discharge.

18. A gas laser apparatus according to claim 17 wherein the high d.c. voltage supplied between the anode and cathode is sufficient to cause glow discharge but not sufficient to produce a laser output in the absence of silent discharge.

19. A gas laser apparatus as claimed in claim 15 further comprising means for controlling the movement of a workpiece to be worked on by said laser output, wherein said silent discharge control means operates in synchronism with said movement control means.

20. A gas laser apparatus according to claim 15 wherein said control means controls the power of silent discharge in such a manner that the laser output is slope-controlled.

21. A gas laser apparatus according to claim 20 wherein said control means controls the output of said a.c. high voltage power source.

22. A gas laser apparatus according to claim 21 wherein said a.c. output of said a.c. high voltage power source is amplitude-modulated.

23. A gas laser apparatus according to claim 21 wherein said a.c. output of said a.c. high voltage power source is frequency-modulated.

* * * * *